United States Patent [19]

Susnjara

[11] 4,440,702
[45] Apr. 3, 1984

[54] METHOD AND APPARATUS FOR MAKING THIN-WALLED PLASTIC ARTICLES

[75] Inventor: Kenneth J. Susnjara, Santa Claus, Ind.

[73] Assignee: RCA Corporation, New York, N.Y.

[21] Appl. No.: 387,150

[22] Filed: Jun. 10, 1982

Related U.S. Application Data

[63] Continuation of Ser. No. 119,975, Feb. 8, 1980, abandoned.

[51] Int. Cl.³ .................. B29C 1/14; B29C 3/04; B29C 7/00; B29C 17/03
[52] U.S. Cl. .................................. 264/37; 264/549; 264/153; 264/160; 264/292; 264/322; 264/335; 425/301; 425/306; 425/397; 425/398; 425/403.1; 425/422; 425/437
[58] Field of Search ............... 264/334, 163, 37, 550, 264/250, 549, 293, 322, 153, 335, 522, 518, 536, 514, 515, 291, 292, 160; 425/527, 289, 383, 387.1, 398, 403.1, 437, 510, 527, 397, 412, 422, 301, 306

[56] References Cited

U.S. PATENT DOCUMENTS

| | | | |
|---|---|---|---|
| 2,120,328 | 6/1938 | Ferngren | 264/163 |
| 3,011,212 | 12/1961 | Marshall et al. | 264/550 |
| 3,030,668 | 4/1962 | Taylor | 18/58.3 |
| 3,081,491 | 3/1963 | Black | 425/387.1 |
| 3,172,159 | 3/1965 | Edwards | 425/437 |
| 3,192,569 | 7/1965 | Knabel | 18/42 |
| 3,218,379 | 11/1965 | Edwards | 425/531 |
| 3,220,902 | 11/1965 | Edwards | 264/250 |
| 3,277,224 | 10/1966 | Whiteford | 264/291 |
| 3,321,562 | 5/1967 | Wanderer | 264/93 |
| 3,329,306 | 7/1967 | Stein | 264/321 |
| 3,337,664 | 8/1967 | Lyon | 264/89 |
| 3,341,893 | 9/1967 | Edwards | 264/550 |
| 3,342,914 | 9/1967 | Edwards | 264/549 |
| 3,342,915 | 9/1967 | Wanderer | 425/310 |
| 3,344,212 | 6/1938 | Francis | 264/37 |
| 3,357,053 | 12/1967 | Lyon et al. | 264/550 |
| 3,418,690 | 12/1968 | Edwards | 18/19 |
| 3,461,761 | 8/1969 | Mojonnier | 83/140 |
| 3,510,913 | 5/1970 | Edwards | 264/549 |
| 3,518,334 | 6/1970 | Carrigan et al. | 264/89 |
| 3,593,377 | 6/1971 | Edwards | 425/437 |
| 3,617,589 | 11/1971 | Jones-Hinton et al. | 264/27 |
| 3,723,582 | 3/1973 | Winstead | 264/37 |
| 3,802,819 | 4/1974 | Alroy | 425/437 |
| 3,822,161 | 7/1974 | Haase | 264/321 |
| 3,832,102 | 8/1974 | Alroy | 425/310 |
| 3,837,782 | 9/1974 | Meissner et al. | 425/387.1 |
| 3,976,730 | 8/1976 | Cushing | 264/37 |
| 3,983,827 | 10/1976 | Meadors | 264/293 |
| 4,118,454 | 12/1978 | Miki et al. | 264/93 |
| 4,170,621 | 10/1971 | Kiefer | 264/322 |
| 4,234,530 | 11/1980 | Thiel et al. | 264/153 |
| 4,242,074 | 12/1980 | Lake | 425/292 |
| 4,244,915 | 1/1981 | Boardman | 425/388 |

Primary Examiner—Willard E. Hoag
Attorney, Agent, or Firm—Birgit E. Morris; Donald S. Cohen

[57] ABSTRACT

An apparatus for forming a thin-walled article comprising a frame providing a forming station for positioning a preheated sheet of thermoplastic material, first and second mold sections mounted on the frame in opposed relation with the forming station disposed therebetween, the first mold section having a forming cavity therein, the second mold section having a forming portion insertable in the forming cavity of the first mold section when the mold sections are displaced toward each other, the forming portion of the second mold section having at least one wall cooperable with at least one wall of the forming cavity of the first mold section when a preheated sheet of thermoplastic material is positioned at the forming station and the mold sections are displaced toward each other for sequentially shearing a blank from the preheated sheet of thermoplastic material and compressing the blank between the mold sections to cause the blank material to flow and form the article, means for ejecting the formed article from the first mold section and means for displacing the mold sections toward and away from each other.

19 Claims, 9 Drawing Figures

METHOD AND APPARATUS FOR MAKING THIN-WALLED PLASTIC ARTICLES

This is a continuation of application Ser. No. 119,975, filed 2/8/80, now abandoned.

This invention relates to a method and apparatus for manufacturing thin-walled articles from thermoplastic materials. The invention further contemplates an apparatus for forming a thin-walled article from a sheet of thermoplastic material by compression molding.

In the use of the conventional method of forming an article from a thermoplastic material by injection molding, the material is first heated and then injected in liquid form, under high pressure, into a closed mold cavity. The material is allowed to cool in the mold to form the desired article and then the formed article is removed to begin a new forming cycle. Where the mold cavity is provided with constricted areas or is uniformly narrow as in the case of a thin-walled article, perhaps having a wall thickness in the order of 0.020 to 0.100 inches, the thermoplastic material must be heated to a comparatively higher temperature to increase its flowability and avoid setting before the entire mold cavity is filled.

Having to heat the forming material of thin-walled articles to higher temperatures presents a problem in seeking to mass produce such articles. If the forming material is cooled at a rapid rate so as to shorten the cycle time in forming the article, internal stresses may be produced in the article which subsequently could result in warpage of the finished product. If the forming material is cooled at a slower rate sufficient to avoid the development of internal stresses in the finished product, the cycle time for forming the article tends to become prohibitive. It thus has been found to be desirable to provide a method of producing a thin-walled article having a wall thickness in the order of 0.020 to 0.100 inches in a short cycle time, in the order of 2 to 5 seconds, in which the formed article is free of excessive internal stresses which could result in subsequent warpage of the finished product.

Accordingly, it is the principal object of the present invention to provide a method for manufacturing thin-walled plastic articles.

Another object of the present invention is to provide an improved method for mass producing high-quality, thin-walled articles economically.

A further object of the present invention is to provide an improved method of manufacturing thin-walled articles having wall thicknesses in the order of 0.020 to 0.100 inches.

A still further object of the present invention is to provide an improved method for making thin-walled articles free of excessive internal stresses in a comparatively short cycle time.

Another object of the present invention is to provide an improved system for manufacturing thin-walled articles.

A further object of the present invention is to provide an improved system for manufacturing thin-walled articles from sheets of thermoplastic material.

A still further object of the present invention is to provide an improved system for producing thin-walled articles from thermoplastic materials, having a short cycle time and providing a high-quality product.

Another object of the present invention is to provide a novel apparatus for forming thin-walled articles from thermoplastic materials.

A still further object of the present invention is to provide a novel apparatus for compression molding thin-walled articles from sheets or webs of thermoplastic material.

Other objects and advantages of the present invention will become more apparent to those persons having ordinary skill in the art to which the present invention pertains from the following description taken in conjunction with the accompanying drawings wherein.

Figure 1:
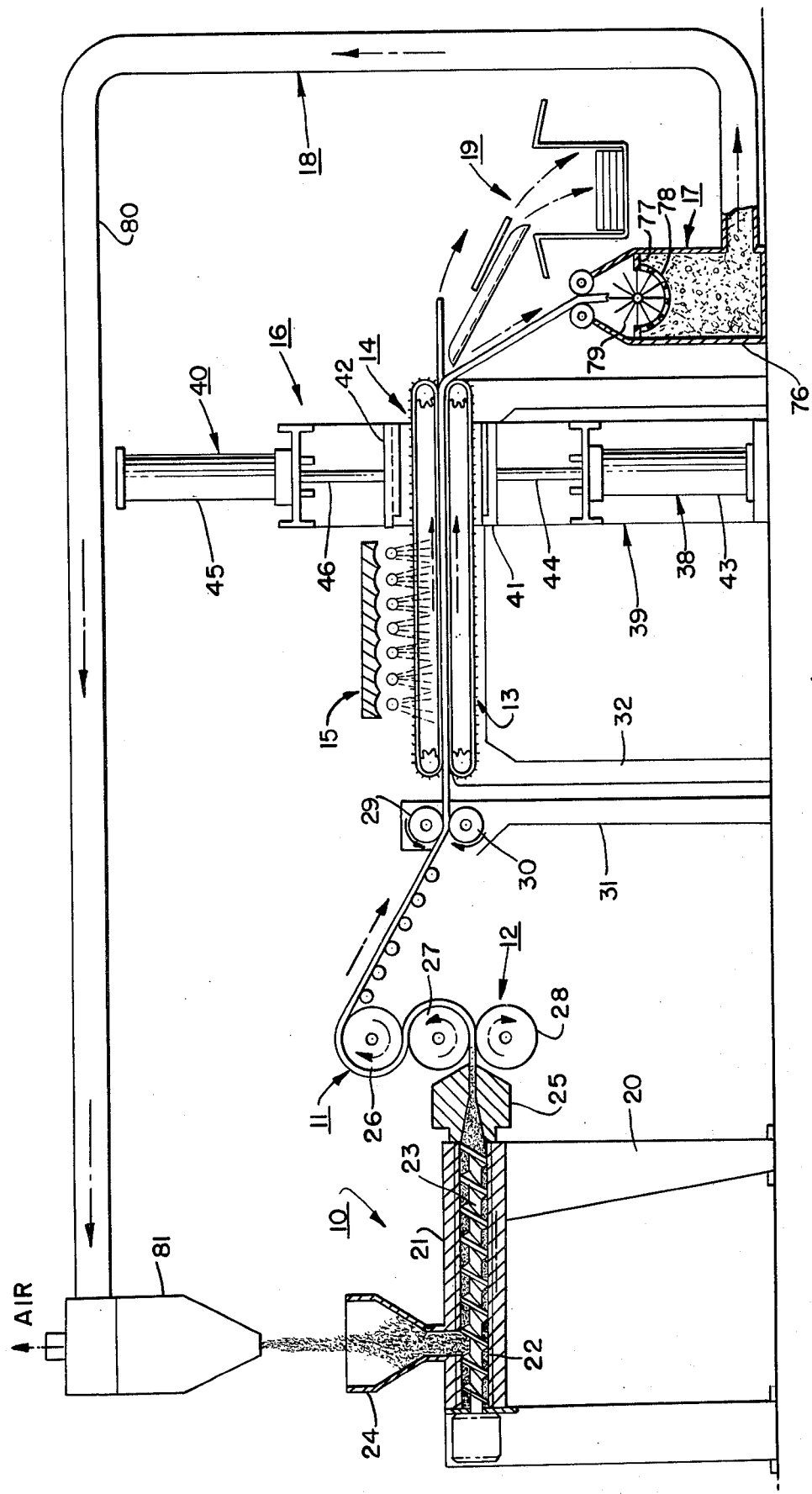
FIG. 1 is a side-elevational view of an embodiment of the invention.
Figure 2:
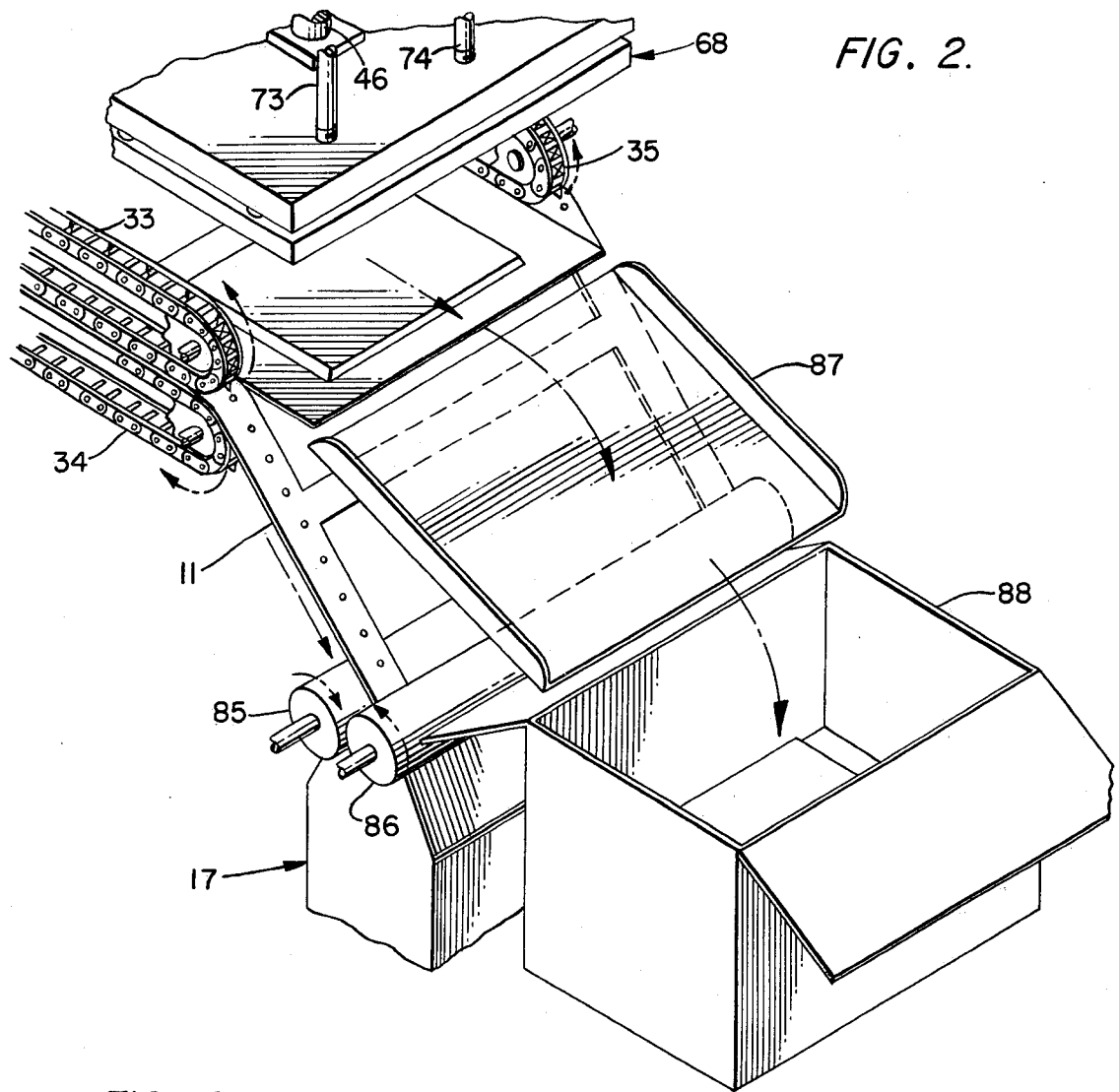
FIG. 2 is an enlarged perspective view of a portion of the system shown in FIG. 1.

Referring to FIGS. 1 and 2, there is illustrated a system embodying the present invention which generally includes an extrusion machine 10 for producing a web 11 of thermoplastic material, a takeoff assembly 12 for sizing, cooling and polishing the web 11, a conveying assembly 13 for guiding the web 11 to and by a forming station 14, a heater assembly 15 for preheating the web segment advanced to the forming station 14, a compression molding machine 16 disposed at the forming station 14, a reducing mill 17 disposed at the end of the conveyor assembly 13, a material recycling system 18 and a packaging station 19.

Extrusion machine 10 consists of a frame 20 on which there is supported an extrusion screw housing 21. The housing 21 is provided with a barrel 22 in which an extrusion screw 23 is mounted. The rear end of housing 21 is provided with an opening intercommunicating a material hopper 24 and barrel 22. A die 25 is mounted on the front end of housing 21 which is provided with a coat-hanger type of manifold in order to extrude a wide, thin web of material. The screw 23 is rotated by a motor mounted on the frame which transmits drive through a drive train including a gear reduction unit to the screw. The machine is of a conventional, single screw-extruder type and operates in the conventional manner to extrude a web of thermoplastic material. Typically, organic polymers, such as polystyrene, polyethylene and polypropylene in pelletized form are fed into the barrel of the extruder through hopper 24 where the pellets are heated. The extrusion screw forces the heated plastic material through die 25 to form a continuous web of material.

Takeoff assembly 12 generally consists of a set of rolls 26, 27 and 28 around which the web emanating from die 25 is guided. Contact with the rolls functions to size, cool and polish the extruded web. Typically, the web may be sized to a thickness in the range of 0.020 inches to 0.100 inches to form a thin-walled article. The web segment emanating from roll 26 is pulled by a set of rolls 29 and 30 supported on a stand 31 and guided toward conveyor assembly 13.

Figure 3:
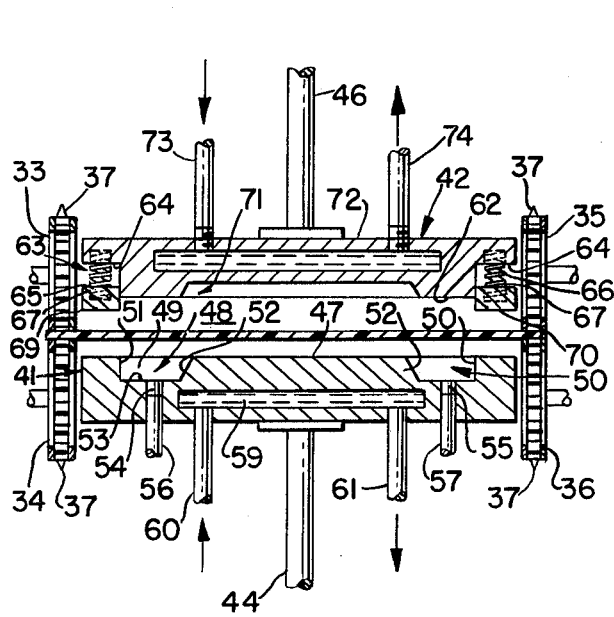
FIGS. 3 through 7 are vertical cross-sectional views of a sequence of positions of a set of mold sections employed in the embodiment shown in FIG. 1, illustrating the positions of the mold sections during a typical molding cycle.

Conveyor assembly 13 is supported on a frame 32 and includes a set of chains 33 through 36. Lower chains 34 and 36 are supported on sprockets having shafts journaled in frame 32. The upper flights of chains 33 and 35 lie substantially in the same horizontal plane. Similarly, chains 33 and 35 are mounted on sprockets having shafts journaled in frame 32, having the upper flights thereof disposed in a common horizontal plane positioned just above the plane of the lower flights of chains 34 and 36 to provide spacings between the opposed flights of chains 33 and 34 and 35 and 36 for receiving a segment of web 11 therethrough. As best shown in FIGS. 2 and 3, the links of chains 33 through 36 are provided with impaling elements 37 which penetrate the marginal portions of the web 11 segment disposed between the chains for advancing the web 11 between the chains 33–36 of the conveyor assembly. The drive sprockets of the conveyor assembly 13 are driven intermittently for indexing the web 11 to forming station 14 in coordination with the operation of compression molding machine 16. Prior to being indexed to forming station 14, the web 11 is preheated to a temperature in the range of 200° F. to 500° F., depending on the type of thermoplastic material being used, by heater assembly 15. The heater assembly 15 can be of any conventional type utilizing electrical resistance or gas-type heating.

Compression molding machine 16 generally includes a lower ram assembly 38 mounted on a frame 39 below forming station 14, an upper ram assembly 40 mounted on the upper end of frame 39 above forming station 14, a lower mold section 41, an upper mold section 42 and a hydraulic actuating system for ram assemblies 38 and 40. Lower ram assembly 38 consists of a cylinder 43 having a ram or piston rod 44 supporting lower mold section 41. Upper ram assembly 40 consists of a cylinder 45 having a ram or piston rod 46 disposed substantially in axial alignment with ram or piston rod 44, and supporting upper mold section 42. As will be seen from FIG. 1, when rams 44 and 46 are extended, lower and upper mold sections 41 and 42 will be displaced toward each other to engage a section of web 11 positioned at forming station 14.

Figure 7:
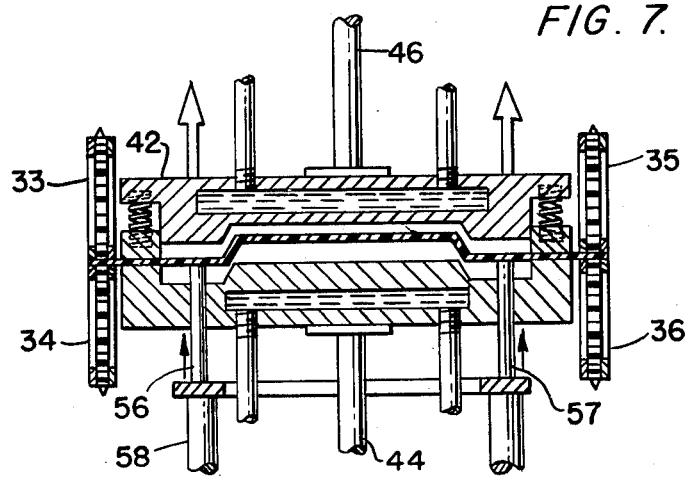
Figure 8:
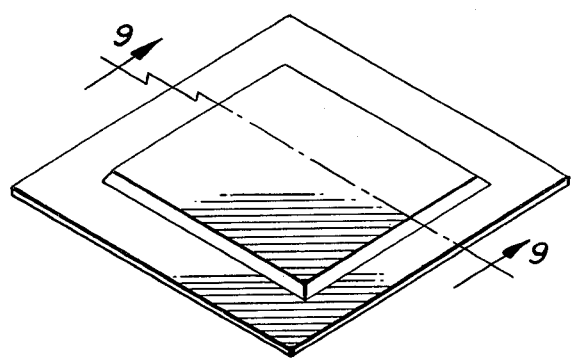
FIG. 8 is a perspective view of an article formed with the system shown in FIG. 1.
Figure 9:
FIG. 9 is a cross-sectional view taken along line 9—9 in FIG. 8.

As best shown in FIG. 3, the upper mating surface 47 of lower mold section 41 is formed with a cavity or depression 48 having a pair of transversely spaced, longitudinal portions 49 and 50 and a pair of transversely disposed front and rear portions, providing a set of outer sidewalls 51, a set of inner beveled sidewalls 52 and a bottom wall 53. Lower mold section 41 further is provided with a pair of vertical openings 54 and 55 communicating with cavity 48 which accommodates a pair of ejector pins 56 and 57. Such pins are mounted on a frame 58, as best shown in FIG. 7, which may be displaced vertically by suitable actuating means of the machine. Lower mold section 41 is also provided with an internal chamber 59 communicating with a set of inlet and outlet conduits 60 and 61 through which a coolant may be circulated to cool the mold section.

Lower mating surface 62 of upper mold section 42 is provided with a peripheral recess 63 defining a horizontal peripheral wall 64 and a pair of vertical walls 65 and 66 and a pair of vertical end walls. Seated in recesses spaced about the periphery of surface 64 is a set of springs 67. A rectangular-shaped clamping frame 68 is supported on the lower ends of springs 67 within peripheral recess 63. Clamping frame 68 consists of a pair of longitudinal portions 69 and 70 and a pair of adjoining front and rear portions. Mating surface 62 also is provided with a cavity or depression 71 having a configuration generally similar to the upper end of the center portion of the lower mold section defined by cavity 48. Upper mold section 42 also is provided with a chamber 72 communicating with inlet and outlet conduits 73 and 74 through which a coolant is circulated for cooling the upper mold section 42.

The transverse dimension between sidewalls 65 and 66 and the longitudinal dimension between the vertical front end and rear walls of recess 63 are fractionally smaller than the transverse dimension between the sidewalls and the longitudinal dimension between the front and rear end walls of cavity 48 so that when the mold sections 41 and 42 are displaced toward each other, the forming portion 75 of the upper mold section 42 will sequentially shear a blank 83 from a section of thermoplastic material 82 positioned at forming station 14 and then compress the blank 83 against the lower mold section 41 to form the desired article 84. The inner surfaces of clamping frame 68 are disposed in sliding engagement with the vertical surfaces of recess 63 and in substantially vertical alignment with the outer wall surfaces 51 of cavity 48. When springs 67 are in their uncompressed state, clamping frame 68 will be positioned slightly below mating surface 62 of the upper mold section 42 so that when upper mold section 42 is moved downwardly toward the lower mold section 41, clamping frame 68 will engage the web section 82 positioned at forming station 14 in advance of the engagement of mating surface 62 with the web section 82.

Reducing mill 17 generally consists of a housing 76 having a partition 77 including an arcuate portion 78 provided with a number of openings. Rotatably mounted in the upper end of housing 76 is a rotary knife cutter 79 which is adapted to receive a segment of web 11 emanating from forming station 14 and coact with the openings in partition portion 78 to reduce the web section 82 into small particles which fall to the lower end of housing 76. Such particles are pneumatically conveyed through a conduit 80 of the pneumatic conveying system 18 to a filter apparatus 81 where the particles are separated from the air stream and fall into hopper 24 for recycling.

In the operation of the system, shown in the drawings, a thermoplastic material such as polystyrene, polyethylene or polypropylene, in pelletized form, is deposited in hopper 24 and thus fed into extruding machine 10. The heated material in the extrusion machine is forced through die 25 to form a web of material 11. The segment of the web 11 emanating from the die passes through and around rolls 26 through 28 and is guided down a conveyor to rolls 29 and 30. The web 11 is then fed into conveyor assembly 13 and is preheated by heater assembly 15. When mold sections 41 and 42 are in their retracted or spaced apart positions as illustrated in FIG. 1, the control mechanism of the system actuates conveyor assembly 13 to advance a section of the preheated web 11 to forming station 14. Under such conditions, the relative positions of the upper and lower mold sections are as illustrated in FIG. 3.

Figure 4:
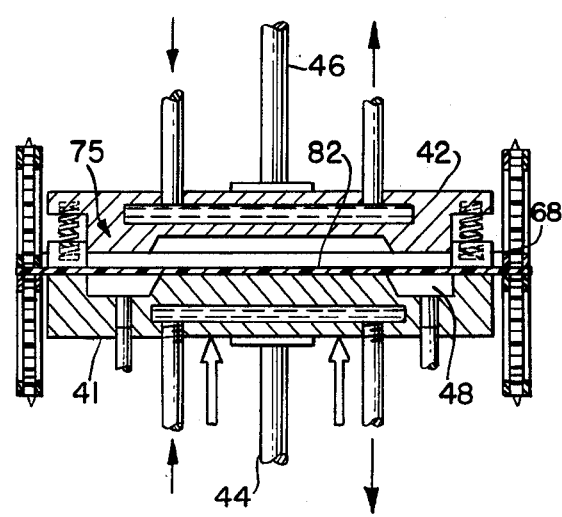
Figure 5:
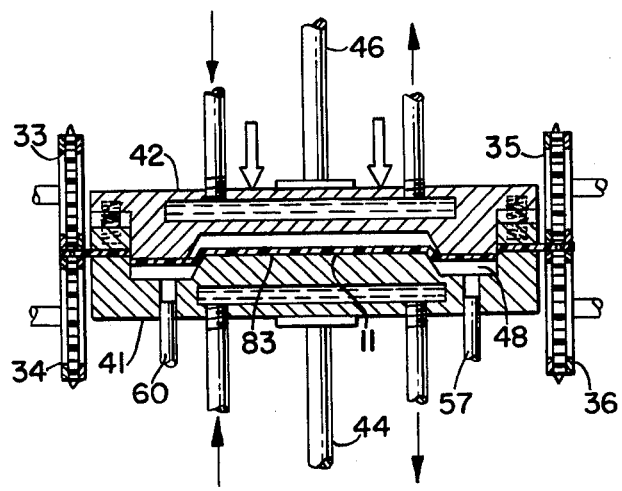
Figure 6:
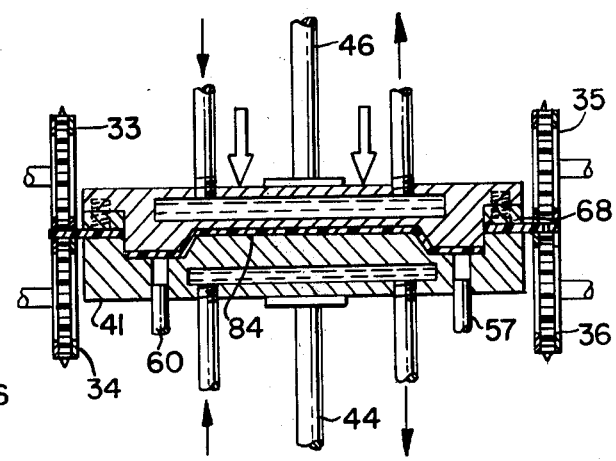

After the web has been indexed, the control mechanism of the system functions to actuate ram assemblies 38 and 40 to extend rams 44 and 46 and correspondingly displace mold sections 41 and 42 toward each other. Sequentially, as the upper and lower mold sections 41 and 42 come together, the lower mold section 41 elevates to a position in engagement with the lower surface of web section 82 positioned at forming station 14, the upper mold section 42 lowers to a position whereby clamping frame 68 engages the upper surface of web section 82 in clamping relation. As shown in FIG. 4, the upper mold section 42 continues to lower so that forming portion 75 shears a blank 83 from web section 82 and begins to force the peripheral portions of the blank 83 into forming cavity 48, as shown in FIG. 5, and then the upper mold section 42 continues to lower thereby compressing blank 83 between the mold sections 41 and 42 to form a finished article 84, as shown in FIG. 6. While the blank 83 remains heated and pliable, the material of the blank 83 is caused to flow to assume its desired configuration as it is compressed between the mold sections 41 and 42. After the blank 83 has been compressed, it is cooled by the heat transfer occurring between the blank 83 and the mold sections 41 and 42 cooled by coolant being circulated through the mold sections 41 and 42, to cause the blank 83 to set. After a preset time interval, the control mechanism of the machine functions to retract the upper mold section 42 as shown in FIG. 7. With the upper mold section 42 sufficiently retracted and the clamping 68 still in engagement with the web section 82, the control mechanism functions to extend frame 58 and thus cause ejector pins 56 and 57 to move upwardly and force the finished article 84 out of forming cavity 48 and through the opening in web section 82. The mold sections 41 and 42 then are retracted to their starting positions so that the finished article 84 rests on the web section 82. The article 84 is prevented from falling through the opening in the web section 82 by virtue of its tight fit in such opening.

When the mold sections 41 and 42 are retracted to their starting positions, the control mechanism of the machine then functions to advance the web 11 again to position a sequential web section 82 at the forming station 14 to repeat the forming cycle as described. The web section 82 with the finished article 84 resting on the upper side thereof simultaneously is advanced, as shown in FIG. 2, at a downward angle to where it is fed between a set of rollers 85 and 86 into reducing mill 17. As the web section 82 emerges from the conveyor assembly and is directed downwardly, the finished article 84 resting on the web section 82 is caused to be thrust forwardly onto a chute 87 which guides the article 84 into a shipping container 88 or some other suitable repository.

The web section 82 fed into reducing mill 17 is reduced by knife cutter 79 into small particles which fall to the bottom of the mill and are then pneumatically conveyed through conduit 80 to filter 81. The particles are then separated from the air stream and are gravity fed back into hopper 24 to be recycled through the system.

Because of the minimal flow of material required in forming the articles in the compression molding machine, the preheating temperature of the web need not exceed a minimum temperature in the range of 200° F. to 220° F. depending on the particular thermoplastic material used. Because the material is heated to such a lower temperature in forming the finished articles, the articles require a smaller temperature drop for cooling, thus correspondingly shortening the cycle time for forming the article. Furthermore, because the smaller temperature drop permits a reduced cooling time, internal stresses in the finished article are avoided which otherwise may subsequently result in warpage of the finished article.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of making a thin-walled article comprising advancing a continuous web of a thermoplastic material to a forming station, intermittently positioning a heated section of said web at said forming station, advancing a female mold section at said forming station to a position adjacent a side of said web section, advancing a male mold section at said forming station on an opposite side of said web section, towards said female mold section to shear a blank from said web section, continuing the advance of said male mold section to compress the sheared blank between the surfaces of the mold sections and correspondingly form said article in said mold sections, cooling said formed article in said female mold section, retracting said male mold section, ejecting said formed article from said female mold section into the opening formed by the shearing of said web section in forming said blank, carrying the formed article away from the forming station by the movement of said web, and then separating said formed article from the web.

2. A method according to claim 1 including clamping said material section to said female mold section prior to advancing said male mold section towards said female mold section to shear said blank, and unclamping said material section after said formed article is ejected from said female mold section.

3. A method according to claim 1 including forming said thermoplastic material as a continuous web and advancing said web to said forming station intermittently.

4. A method according to claim 3 including passing said web through an oven to heat said material section prior to advancing said material section to said forming station.

5. A method according to claim 3 including diverting the direction of travel of said web as it emerges from said forming station to separate said article from said web.

6. A method according to claim 5 including guiding said separated article away from said web.

7. A method according to claim 3 including forming said web by extrusion.

8. A method according to 7 including forming said web from a material selected from a group consisting of polystyrene, polyethylene and polypropylene.

9. A method according to claim 7 including recovering the web portion emerging from said forming station and conveying said web portion to means for extruding said web.

10. A method according to claim 9 including recovering the web portion emerging from said forming station, reducing said web portion to particulate form and conveying said particulate to said extruding means.

11. An apparatus for making a thin-walled article from a thermoplastic material comprising a forming station, means for intermittently advancing a continuous web of said thermoplastic material to and by said forming station, a female mold section disposed at said forming station, movable to a position adjacent a side of a section of said web when said web section is positioned at said forming station, a male mold section disposed at said forming station, movable toward said female mold section when said web section is positioned at said forming station, said male mold section having means cooperating with said female mold section for sequentially shearing a blank from said web section and then compressing said blank between mating surfaces of said male mold section and said female mold to form said article, means for ejecting said formed article from said mold into the opening in said web section formed by the shearing of said blank so that the movement of the web will carry the formed article away from the forming station, and means for separating said formed article from the web after it has been carried away from the forming station.

12. An apparatus according to claim 11 including means for diverting the direction of travel of a portion of said web emerging from said forming station to separate said article from said web.

13. An apparatus according to claim 12 including means for guiding said separated article away from said web portion emerging from said forming station.

14. An apparatus according to claim 11 including means for clamping said material section to said material mold section prior to advancing said male mold section towards said female section to shear said blank.

15. An apparatus according to claim 11 including means for extruding said thermoplastic material to form a web thereof, and means for intermittently advancing said web to said forming station.

16. A method according to claim 15 including means for heating said web prior to advancing said web to said forming station.

17. An apparatus according to claim 15 including means for recovering a portion of said web emerging from said forming station and means for conveying said emerging web portion to said extruding means.

18. An apparatus according to claim 15 including means for recovering the portion of said web emerging from said forming station, reducing said emerging web portion to particulate form and means for conveying said particulate material to said extruding means.

19. Apparatus according to claim 18 including means for pneumatically conveying said particulate material to said extruding means.

* * * * *